March 20, 1956 R. C. ROI 2,738,818
VEGETABLE MASHER ROTATING ON A VERTICAL AXIS
Filed Nov. 30, 1949 2 Sheets-Sheet 1
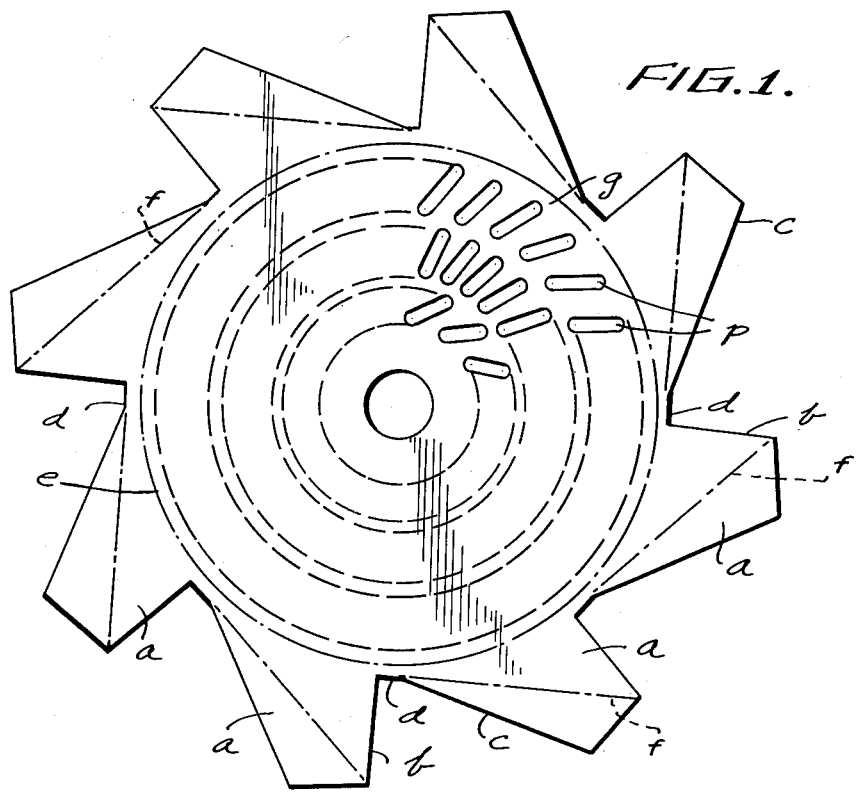
FIG.1.
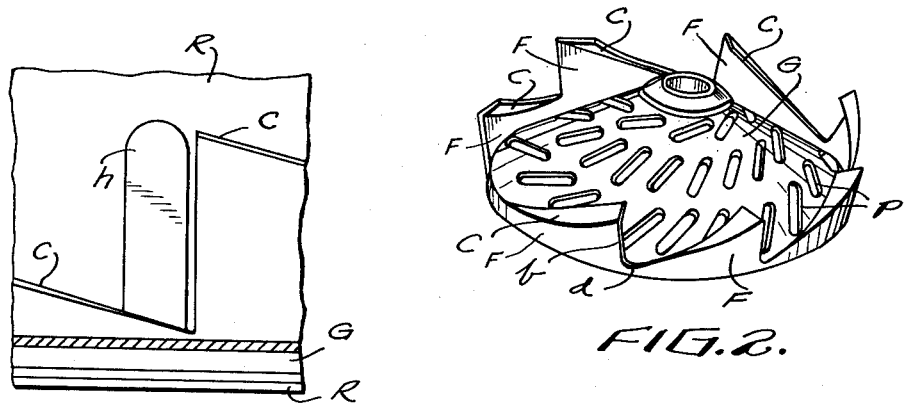
FIG.5.
FIG.2.
INVENTOR
RENE CHARLES ROI
BY March 20, 1956 R. C. ROI 2,738,818
VEGETABLE MASHER ROTATING ON A VERTICAL AXIS
Filed Nov. 30, 1949 2 Sheets-Sheet 2

INVENTOR
RENE CHARLES ROI
BY

United States Patent Office 2,738,818
Patented Mar. 20, 1956

2,738,818

VEGETABLE MASHER ROTATING ON A VERTICAL AXIS

René Charles Roi, Paris, France, assignor to Societe Civile d'Etudes pour la Fabrication de Produits Industriels Manufactures (S. E. P. I. M.), Paris, France, a corporation of the French Republic Application November 30, 1949, Serial No. 130,113

Claims priority, application France December 8, 1948

12 Claims. (Cl. 146—175)

The present invention relates to household apparatus adapted to sieve, hash, crush and mash food and the like, comprising a container provided with a perforated bottom acting as a sieve or grate, and mashing means such as the moving lower edge of a helical compression member which is driven by a crank axle, the mashing means being resiliently maintained in contact with the perforated bottom.

This invention more particularly relates to mashers and similar apparatus having knives or baffles arranged at the internal periphery and bottom portion of a container or other tubular casing for preventing the products to be mashed and sieved to be carried out of the container by rotation of the compression member, and to cause the product, which otherwise would have a tendency to be deviated and rise along the internal wall of the container, to move toward the grate.

In the known apparatus, the knives or baffles which cooperate with the edge of the mashing means for cutting elongated, string-like product are welded obliquely on the internal wall of the container. In such an arrangement it is not possible to use removable grates inasmuch as the projecting knives or baffles will be in the way.

A primary object of my invention is the provision of a household apparatus of the type described which has peripheral baffles, a removable grate and means for insuring the positioning and locking in place of the grate.

The apparatus according to the invention is characterized in that the grate comprises a peripheral wall having conventional knives or baffles, which grate corresponds in shape to the lower portion of the internal wall of the container, which wall is provided with means for insuring the positioning and locking in place of the grate.

As a result of this arrangement, the grate may be easily removed so as to facilitate the cleaning of the plate and the knives or baffles.

It is another object of my invention to provide a grate made out of a single piece of sheet metal in such a manner that the blank sheet metal has a plurality of outwardly directed projections so that when the grate is stamped the projections are shaped into the form of knives or baffles. In this way, the knives are integral with the grate whereby a considerable saving of material is realized and the need to weld any knives onto the grate is dispensed with.

It is a further object of my invention to provide a grate having a castellated periphery formed by knives. The bottom portion of the periphery consists of a narrow metal strip, while the internal wall of the container within which the grate is mounted has at least one projecting stop adapted to engage the grate, which stop corresponds at least partially to the shape of the periphery and is arranged in such a maner so that when the grate is placed within the container the metal strip passes over the stop by causing the deformation of the wall of the container, which wall is resilient, and the grate then comes to rest against the lower end of the container as soon as the wall is permitted to assume its original shape. In this manner, the grate is positioned with respect to the container and locked into position so that it can neither rotate with respect to the container as a result of the edges of the stop having engaged the castellated part of the grate nor move axially with respect to the container as a result of the resilient locking means described above.

In practice the wall of the container may include a plurality of stops, which as two, which are evenly spaced apart.

Other objects and advantages of the invention will become apparent during the course of the following description.

With the above objects in view the present invention mainly consists of a mashing apparatus comprising a tubular casing, a generally conical one-piece combined bottom and a baffle unit removably connected to the casing adjacent one end thereof which consists of one piece of sheet metal having the shape of the unit and including a perforated bottom wall. The bottom wall has at least one supporting sheet portion at the periphery thereof which extends upwardly relative to the bottom wall portion and a baffle sheet portion at the upper edge of the supporting sheet portion which extends inwardly relative to the supporting sheet portion. The inwardly extending baffle sheet portions is elongated and slopes, from one end thereof to the opposite end thereof downwardly toward the bottom wall portion so as to guide products to be mashed, such as food and the like, through the perforated bottom wall portion of the unit. A pair of stop members are fixed to the inner surface of the tubular casing so as to provide locking means for preventing rotational and axial movement of the unit with respect to the casing. Mashing means are mounted on the casing for pressing the products against the unit.

In the accompanying drawings which form a part of this application and in which like numerals are employed to designate like parts throughout, Fig. 1 is a plan view showing how the grate is cut;

Fig. 2 is a perspective view of a frusto-conical grate according to the invention obtained by using the blank shown in Fig. 1;

Fig. 5 is a fragmentary partly sectional view of a releasable lock structure of the invention taken along line 5—5 of Fig. 3 in the direction of the arrows.

A blank $g$ is cut from a stock of sheet metal, the blank having a configuration as illustrated in Fig. 1. The blank was a central portion having a central aperture for receiving the axle of a mashing means, perforations $p$, and asymmetric projections $a$ which are evenly distributed around the central portion. In the illustrated embodiment eight such projections are shown. Each projection, as shown in Fig. 1, has a short side $b$ which is substantially radially, a circumferential side $x$ and a large side $c$, which is obliquely arranged as illustrated in Figure 1. A comparatively short circumferential portion $d$ separates one projection from another.

The blank $g$ is then stamped so as to form the frusto-conical grate G shown in Fig. 2. The peripheral rim portion of the grate is bent upwardly along the line $e$ shown in Fig. 1. The shape of this upwardly bent rim portion is such that it will correspond exactly to the container or tubular support of the masher in combination with which the grate G is adapted to be used.

Finally, the projections are inwardly bent at right angles so as to form the flange-like baffle sheet portions or knives C, the lower faces of which act as downwardly directed ramps in the usual direction of rotation of the mashing means. The projections are bent along the respective lines $f$ shown in Fig. 1 so that the baffle sheet portions are supported by the supporting sheet portions F. The baffle sheet portion and supporting sheet portion together constitute one of the baffles.

The frusto-conical edge of the grate thus formed comprises a castellation defined by the sides $b$, the bending lines $f$ and the edges $d$ which are parallel to the circumference $e$, and the stamped grate G constitutes a complete one-piece combined bottom and baffle unit.

Figure 3:
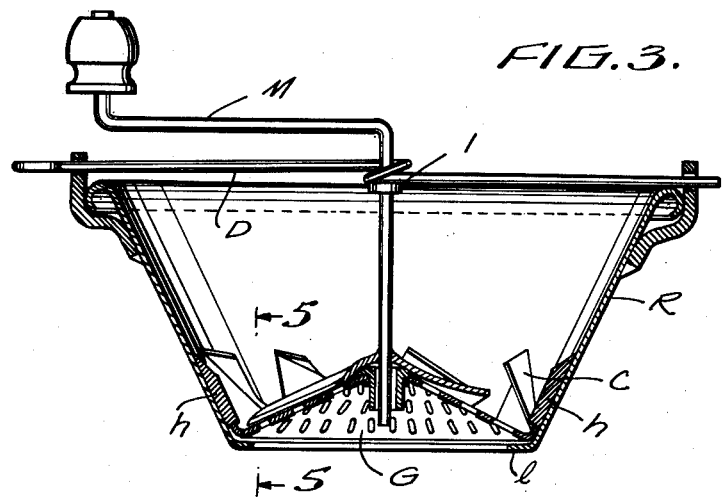
Fig. 3 is a sectional view of a mashing apparatus provided with a grate according to the invention.
Figure 4:
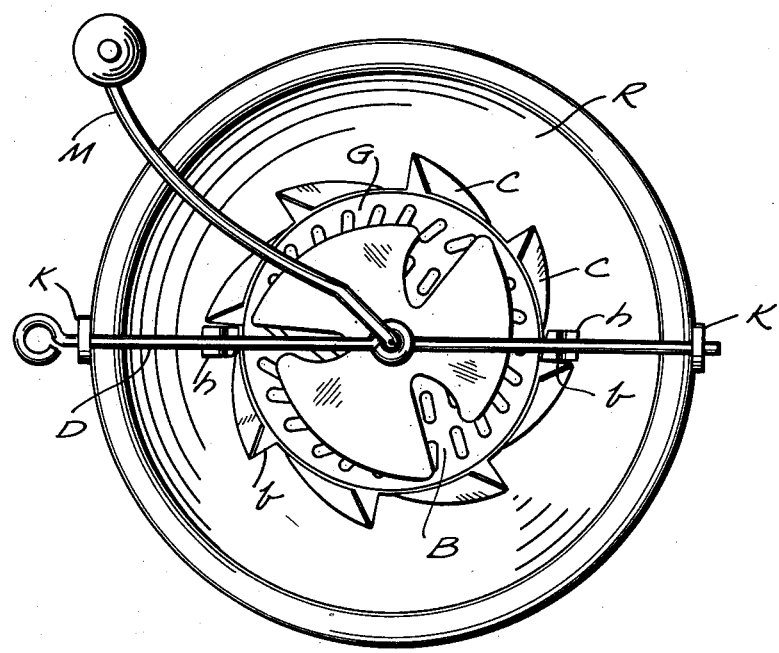
Fig. 4 is a plan view of a masher apparatus provided with a grate according to the invention.

Figs. 3 and 4 show a frusto-conical container or tubular support R having an annular inwardly extending flange $l$ located at the bottom thereof. The inner wall of the container R has at its lower portion a number of evenly distributed bosses or stops $h$ shown in detail in Fig. 5, the foresides and lower portions of which correspond, respectively, to the shape of one of the edges $e$ and one of the edges $d$. The grate G may thus be positioned at the bottom of the container R by deforming the resilient side wall of the container.

It will be understood, therefore, that when the frusto-conical grate G is placed in its operative position, as is shown particularly in Fig. 3 of the drawing, the edge of the grate rests upon the flange portion $l$ formed at the lower part of container R and at the same time is positioned under the stops $h$. In this manner the edge of the grate is held against downward movement by the annular flange $l$, against lateral movement by the side wall of the container, and against upward movement by the stops $h$. In the illustrated embodiment two such stops have been shown; it will be understood, however, that any desired number of evenly placed stops may be used. Also, when a crank handle M of the masher means is rotated any rotational movement of the grate is prevented by the stops $h$ which are located between two adjacent knives or baffles C since these baffles are integral with the grate. It is apparent, therefore, that both rotational and axial movement of the grate with respect to the container R is prevented and that the stops $h$ together with the inherently resilient side walls of the container form a snap lock means.

The mashing means illustrated in the drawings comprises a crushing member B having three component parts, which crushing member is rigidly connected to a crank axle M which passes through the central eye of a resilient bar D. The resilient bar D passes through two hooks K secured to the container and biases the crushing member B against the grate G by bearing against a collar I fixedly mounted to the crank axle.

When it is desired to remove the grate for cleaning purposes the masher means assembly is removed and it is then sufficient to exert outwardly on the side wall of the container a light pressure at the location where the stops $h$ are provided in order to move these stops away from the edge of the grate.

It is obvious that the invention is not limited to the embodiment shown and described but may be used in any household apparatus of the type described, regardless of the shape of the grate and container, the number of component parts of the mashing means, and the nature of the resilient member maintaining the latter in contact with the grate.

What I claim is:

1. Masher apparatus, comprising, in combination, a frusto-conical continuous side wall having opposite open top and bottom ends, said bottom end being of a smaller diameter than said top end and said side wall having an annular inwardly extending flange located at said bottom end thereof; a pair of stop members fixed to the inner surface of said side wall at opposite parts thereof and being located at a predetermined distance above said annular flange; a conical perforated plate forming a bottom wall for the masher and having a substantially pointed top end and a peripheral bottom portion, said plate being located within said continuous side wall and having said peripheral bottom portion thereof resting on said annular flange of said side wall, said peripheral bottom portion including an upwardly extending rim portion, and said plate having a plurality of baffles located next to the inner surface of said side wall and extending upwardly from said rim portion, said baffles each having at the top end thereof a flange portion extending inwardly toward the center of said plate and extending downwardly toward said plate from one end of each flange portion to the opposite end thereof, said stop members each being located between a pair of said baffles and directly over said rim portion of said bottom plate; and means removably mounted on said side wall for pressing food and the like against the top face of said plate to force the food through the perforations of said plate so as to mash the food.

2. In a vegetable masher, a removable grater bottom composed of a bottom portion having openings therethrough, said bottom portion being provided with at least one peripheral upwardly extending wall portion and a slanted flange extending inwardly from said wall portion and spaced from said bottom portion, whereby vegetables being mashed will be urged by said inwardly extending flange to move into contact with said bottom portion.

3. In a vegetable masher, a removable grater bottom composed of a bottom portion having openings therethrough, said bottom portion being provided with at least one peripheral upwardly extending wall portion having a slanted top edge and a flange extending inwardly from said slanted top edge of said peripheral upwardly extending wall portion, whereby vegetables being mashed will be urged by said inwardly extending flange to move into contact with said bottom portion.

4. In a vegetable masher, a removable grater bottom composed of a bottom portion having openings therethrough, said bottom portion being provided with at least one peripheral upwardly and outwardly extending wall portion having a slanted top edge and a flange extending inwardly from said slanted top edge of said upwardly and outwardly extending wall portion, whereby vegetables being mashed will be urged by said inwardly extending flange to move into contact with said bottom portion.

5. In a vegetable masher, a removable grater bottom composed of a bottom portion having openings therethrough, said bottom portion being provided with a plurality of annularly spaced peripheral upwardly and outwardly extending wall portions having slanting top edges, respectively, and a plurality of flanges respectively extending inwardly from said slanting top edges of said upwardly and outwardly extending wall portions, whereby vegetables being mashed will be urged by said inwardly extending flanges to move into contact with said bottom portion.

6. In a vegetable masher, a removable grater bottom composed of a bottom portion having openings therethrough, said bottom portion being provided with at least one peripheral upwardly extending wall portion having a slanted top edge and a flange extending inwardly from said slanted top edge of said peripheral upwardly extending wall portion, being tapered, and having opposite ends one of which is wider than and located more distant from said bottom portion than the other, whereby vegetables being mashed will be urged by said inwardly extending flange to move into contact with said bottom portion.

7. In a vegetable masher, a removable grater bottom composed of a conical bottom portion having openings therethrough and having a central apex portion higher than its periphery, said bottom portion being provided with at least one peripheral upwardly extending wall portion having a slanted top edge and a flange extending inwardly from said slanted top edge of said peripheral upwardly extending wall portion, whereby vegetables being mashed will be urged by said inwardly extending flange to move into contact with said bottom portion.

8. In a vegetable masher, a removable grater bottom composed of a conical bottom portion having openings therethrough and having a central apex portion higher than its periphery, said bottom portion being provided with at least one peripheral upwardly and outwardly extending wall portion having a slanted top edge and a flange located laterally beyond said bottom portion and extending inwardly from said slanted top edge of said peripheral upwardly extending wall portion, whereby vegetables being mashed will be urged by said inwardly extending flange to move into contact with said bottom portion.

9. In a vegetable masher, a removable grater bottom composed of a bottom portion having openings therethrough, said bottom portion being provided with at least one peripheral upwardly and outwardly extending wall portion having a slanted top edge and a flange located laterally beyond said bottom portion and extending inwardly from said slanted top edge of said peripheral upwardly extending wall portion, whereby vegetables being mashed will be urged by said inwardly extending flange to move into contact with said bottom portion.

10. In a vegetable masher, in combination, a tubular outer casing having opposite open ends and having an inwardly extending annular flange at one end; and a removable grater bottom located in said casing and resting on said inwardly extending annular flange thereof, said grater bottom having openings therethrough and including a bottom portion provided with at least one peripheral upwardly extending wall portion located along the inner face of said casing and having a slanted top edge and a flange extending inwardly from said slanted top edge of said peripheral upwardly extending wall portion to urge vegetables being mashed to move into contact with said bottom portion.

11. In a vegetable masher, in combination, a tubular outer casing having opposite open ends and having an inwardly extending flange at one end; a removable grater bottom located in said casing and resting on said inwardly extending annular flange thereof, said grater bottom being composed of a bottom portion having openings therethrough, said bottom portion being provided with at least one peripheral upwardly extending wall portion located along the inner face of said casing and having a slanted top edge and a flange extending inwardly from said slanted top edge of said peripheral upwardly extending wall portion to urge vegetables being mashed to move into contact with said bottom portion; and snap lock means located on the inner face of said casing and engaging the top edge of said grater bottom for releasably maintaining the latter in said casing.

12. In a vegetable masher, in combination, a tubular outer casing having opposite open ends and having an inwardly extending flange at one end; a removable grater bottom located in said casing and resting on said inwardly extending annular flange thereof, said grater bottom being composed of a bottom portion having openings therethrough, said bottom portion being provided with at least one peripheral upwardly extending wall portion located along the inner face of said casing and having a slanted top edge and a flange extending inwardly from said slanted top edge of said peripheral upwardly extending wall portion to urge vegetables being mashed to move into contact with said bottom portion; and means carried by said casing for pressing vegetables being mashed against the top face of said bottom portion of said grater bottom and through the openings thereof.

References Cited in the file of this patent

UNITED STATES PATENTS

| | | |
|---|---|---|
| 505,504 | Zane | Sept. 26, 1893 |
| 1,913,357 | Ball | June 13, 1933 |
| 1,979,748 | Kimmel | Nov. 6, 1934 |
| 2,054,038 | Mantelet | Sept. 8, 1936 |
| 2,070,137 | Mantelet | Feb. 9, 1937 |

FOREIGN PATENTS

| | | |
|---|---|---|
| 125,893 | Austria | Dec. 10, 1931 |
| 732,352 | France | June 14, 1932 |
| 798,015 | France | Feb. 24, 1936 |
| 349,130 | Italy | June 8, 1937 |
| 192,542 | Switzerland | Dec. 16, 1937 |
| 510,268 | Great Britain | July 31, 1939 |